May 6, 1958   R. P. KESL ET AL   2,833,365
GAS ENGINE FUEL TANK ON HOOD DOOR
Filed Sept. 24, 1954

INVENTORS
R. P. KESL &
J. P. TOWNSEND

United States Patent Office 2,833,365
Patented May 6, 1958

2,833,365

GAS ENGINE FUEL TANK ON HOOD DOOR

Richard P. Kesl, Waterloo, and John P. Townsend, Cedar Falls, Iowa, assignors to Deere Manufacturing Co., Dubuque, Iowa, a corporation of Iowa Application September 24, 1954, Serial No. 458,242

7 Claims. (Cl. 180—69)

This invention relates to an internal combustion engine and means for mounting a part complementary to the internal combustion engine so that it will move to and from an operative position proximate to the engine. More particularly, it relates to a diesel powered tractor having an auxiliary engine associated therewith for starting the diesel engine and means for mounting the fuel container for the auxiliary engine on the tractor so that it may move to and from a position proximate to the engine.

On a tractor in particular, there exists a limited amount of space in which to place the many engine parts and accessories associated with the engines. Many of these parts require periodic checking, refilling, repairing, or replacement and as such must be in view or must be available for removal. This dictates somewhat where they are to be placed in relation to the engines. There are many vacant or unused spaces that are partially hidden or not readily available about an engine where the parts could be placed if it were not for the aforesaid requirements. Previously these spaces were of no importance since the parts and engine accessories were less numerous. However, as engines became more complicated the engine complementary parts became more and more numerous. This necessitated the utilization of these previously unused and partially hidden spaces. It is therefore one of the purposes of this invention to provide means by which the engine complementary parts may be placed in these less accessible spaces when the tractor or vehicle is in operation and may be easily and temporarily moved to a location where they are more accessible for inspection, refilling, repairing, or replacing. In the particular species shown, and by way of explanation, the invention is illustrated as regards a fuel tank associated with a starting engine on a diesel powered tractor.

Certain engines, particularly of the diesel type, are inherently difficult to start after exposure to low ambient temperature. It is therefore common practice to provide an auxiliary engine, usually of the gasoline type, to serve as a starting engine and to turn the larger diesel engine over until it is able to continue on its own. It is therefore obvious that two fuel containers or fuel tanks are required, a main container or diesel fuel tank associated with the diesel engine and an auxiliary container or gasoline tank associated with the starting engine. From a practical standpoint, as well as an appearance standpoint, it is the practice to mount the fuel tanks under the hood and overlying the engines. It is normal, therefore, to have the fuel intake associated with each of the fuel tanks to extend outwardly from the hood. With such an arrangement there always exists the possibility that the wrong type of fuel may be placed in one of the tanks.

It is therefore also a purpose of this invention to provide novel means for mounting the auxiliary engine fuel container on the tractor. In this particular form of the invention provision is made for an opening through the hood sufficiently large to permit the passage of the auxiliary fuel tank. The opening cover or closure member, conforming generally to the shape of the opening and registrable with and for closing said opening, is hingedly mounted on the edge of the opening. The auxiliary fuel container is mounted on the closure member in such a position that when the closure member covers the opening the auxiliary fuel container will be disposed under the hood. As the closure member is swung to and from its open and closed position the auxiliary fuel tank will pass through the opening. In this manner the fuel filler neck on the auxiliary fuel container will be accessible only when the closure member is in the open position, and will normally be inaccessible when the tractor is in operation. Thus, the possibility of inadvertently using the wrong type of fuel for the auxiliary engine is reduced.

These and other advantages of the invention will become apparent to one skilled in the art after consideration of the following description taken in conjunction with the accompanying drawings.

Figure 1:
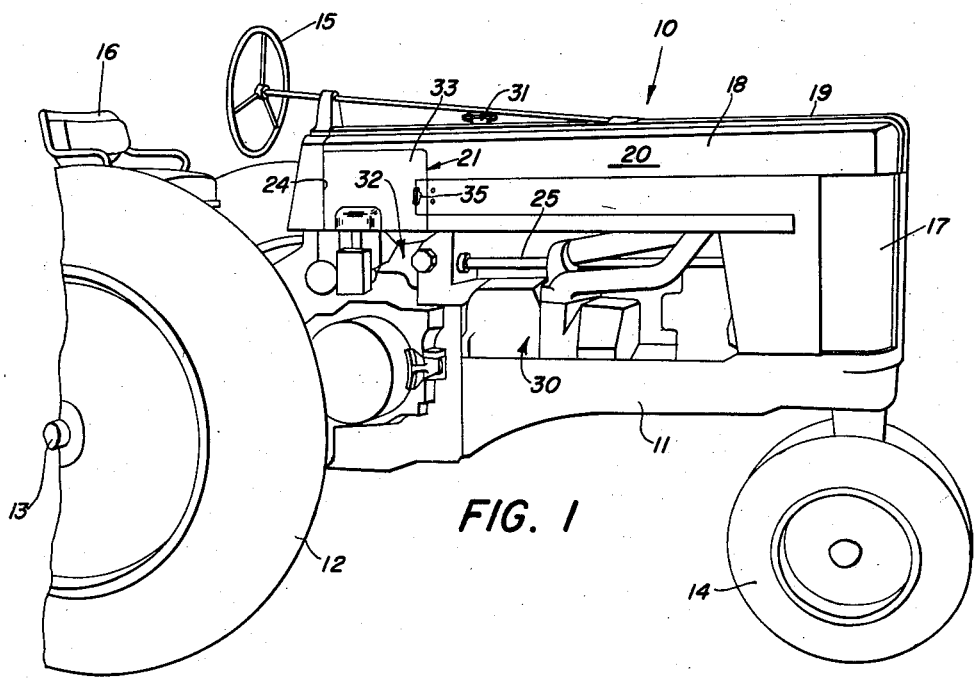
Figure 1 is a side perspective view of a tractor incorporating the invention.

The tractor, designated in its entirety by the reference numeral 10, is of a usual commercial type having a longitudinal body including a main supporting structure or frame 11. The tractor is supported on its rear by two transversely spaced apart rear wheels mounted on rear axles, representative of which are one rear wheel 12 and one axle 13. The frame is supported at its front end by a steerable front wheel structure 14 controlled by a steering wheel 15 proximate to an operator's station represented by a seat 16. Also included in the body of the tractor is a front grille 17 and an engine hood 18 having an engine-overlying portion 19 and at each side a depending portion 20 that serve to partially encase the tractor engines.

The tractor is powered by an internal combustion engine of the diesel type, indicated in its entirety by the reference numeral 30. An associated diesel fuel container or tank, the presence of which is apparent from the location of its filler neck 31, is mounted under the hood 18 on the frame 11. An auxiliary-fuel-consuming or starting engine 32 is mounted to the rear of the diesel engine 30 and is in operation only in the initial stages of starting the diesel engine. Inasmuch as details of the power units including the diesel engine and starting engine are not necessary for a full and complete understanding of the invention, such will be omitted. However, a full disclosure of such is available in the U. S. patent to Petersen, 2,437,121. Also not explained in detail but indicated in its entirety by the reference numeral 25 is a fan-driving shaft mechanism fully disclosed in the U. S. patent to McCray, 1,848,260.

A section of one of the depending side portions 20 of the engine hood 18 is removed to provide an engine-access opening 21 having an upper edge 22, a front upright edge 23, and a rear upright edge 24. As shown clearly in Fig. 2, the rear upright edge 24 is also a vertical portion of the supporting structure. The opening 21 is positioned just forwardly of the operator's station 15 and on the right of the hood 18, as viewed from a position to the rear of the tractor.

A rigid, positionable member in the form of a cover or closure member 33 for covering and uncovering the opening is mounted on the hood by hinge or movable means 34 extending between the rear upright edge of the opening 21 and the rear vertical edge of the closure member 33. The hinge means 34 is cooperative with the closure member 33 to move the latter in and out of opening and closing position.

Mounted on the closure member 33 in a position proximate to the forward edge of the member when it is in the closed position is a latch 35. A bracket 36 is fixed to the hood, as by welding, in a position proximate to the front upright edge 23 of the opening 21 and projects rearwardly and into the opening 21. A latch receiving opening 37 is cut into the fixed bracket 36 in a position to receive the latch 35 on the closure member 33. The latch and the bracket in this manner serve in combination as releasable securing means for holding the closure member in a closed position.

An auxiliary fuel container 40, associated with the starting engine for furnishing fuel thereto and having one surface 42 adjacent to the closure member 33, is fixed in a suitable manner to the member. A fuel intake or filler neck 41 is provided at the upper surface of the fuel container 40. Fuel outlet means terminating in a fuel hose connection 45 is mounted on the bottom surface of a fuel container 40. Flexible fuel-transferring means represented by the reference numeral 44 and being of a fuel hose variety extends from the fuel hose connection 45 to a carburetor 47 on the starting engine. A clip 46 is provided to aid in supporting the fuel hose 44.

Figure 2:
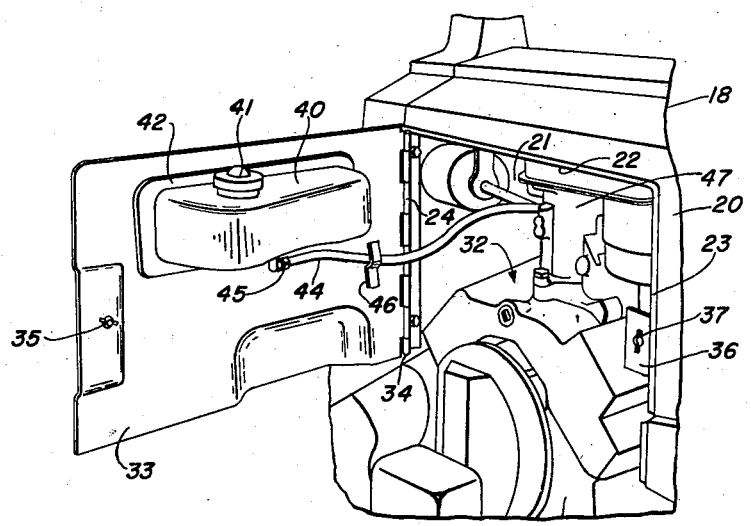
Figure 2 is a perspective view of a portion of the tractor and showing in more detail the invention.

Since the closure member 33 is hingedly connected to the hood 18, the fuel container 40 can be swung to the position shown in Figure 2 where it can be inspected or refueled as desired. The closure member 33, being movably mounted, upon movement from its open position, as shown in Figure 2, to its closed position, as shown in Figure 1, will cause the fuel container 40 to move through the opening 21 to an operative or engine-proximate position within the hood 18. In this position the fuel intake 41 will be inaccessible. Only when the closure member 33 is in the open position will the fuel intake 41 be available for inspection or refueling.

Although the invention has been shown in relation to a fuel tank being mounted on a member that is moved in and out of proximity to the engine, it is desired not to so limit the invention, because many variations of the particular species of the invention shown could be ascertained without departing from the fundamental concept of the invention. It is therefore desired not to limit or narrow the invention beyond that which is claimed.

What is claimed is:

1. In a vehicle having a main fuel-consuming engine and a main fuel container associated therewith, an auxiliary fuel-consuming engine having an auxiliary fuel container associated therewith, and hood means mounted on the vehicle and over the engines and having an opening therein, the improvement residing in: a closure member registrable with and for covering and uncovering said opening; means mounting the closure member on the vehicle for movement of said member into and out of opening-covering position; means mounting the auxiliary fuel container on and for movement with said member to pass inwardly through the opening and within the hood means as the closure member is moved to its opening-covering position and to pass outwardly through the opening and outside the hood means when the member is in its open position, and flexible fuel-transferring means extending from the auxiliary fuel container to the auxiliary fuel consuming engine and being mounted in a manner so as to accommodate movement of the member to and from its covering position.

2. In a vehicle having a main fuel-consuming engine and a main fuel container associated therewith, an auxiliary fuel-consuming engine having an auxiliary fuel container associated therewith, and hood means mounted on said vehicle over at least one of the engines and having an opening therein, the improvement residing in: a closure member for covering and uncovering said opening; means mounted on the closure member for movement of said member into and out of opening-covering position; and means mounting the auxiliary fuel container on said member in such a manner and in such a position that the auxiliary fuel container will pass through the opening as the closure member is moved to and from its covering position and will be enclosed by the hood means when the member is in covering position.

3. In combination: a diesel engine mounted on a tractor affording power to move the tractor over the ground and a diesel fuel container associated therewith; an auxiliary fuel-consuming engine mounted on the tractor and cooperative with the diesel engine for starting the latter; hood means mounted on said tractor above the engines and having an opening therein; a closure member registrable with and for covering and uncovering said opening; means mounting the member on the hood means for movement of the member in and out of covering position; an auxiliary fuel container mounted on the member for movement of the auxiliary fuel container through the opening and to extend within the hood means as the closure member is moved to its covering position; and flexible fuel-transferring means extending between and connected to the auxiliary fuel container and the auxiliary fuel-consuming engine.

4. In combination: a diesel engine mounted on a tractor affording power to move the tractor over the ground and a diesel fuel container associated therewith; an auxiliary fuel-consuming engine mounted on the tractor and cooperative with the diesel engine for starting the latter; hood means mounted on said tractor over at least one of the engines and having an opening therein; a closure member hingedly mounted on the hood means and registrable with and for covering said opening; an auxiliary fuel container mounted on the member so that the auxiliary fuel container will pass through the opening and will extend within the hood means as the closure member is swung to its covering position; and flexible fuel-transferring means extending from the auxiliary fuel container to the auxiliary fuel-consuming engine and being so mounted to provide uninterrupted movement of the member to and from its covering position.

5. In combination: a diesel engine mounted on a tractor affording power to move the tractor over the ground and a diesel fuel container associated therewith; an auxiliary fuel-consuming engine mounted on the tractor and cooperative with the diesel engine for starting the latter; hood means mounted on said tractor for covering at least one of the engines, the hood means having an opening therein; a closure member hingedly mounted on the hood means and registrable with and for covering said opening; and an auxiliary fuel container mounted on the member so that the auxiliary fuel container will pass through the opening and will extend within the hood as the closure member is swung to its covering position.

6. In a vehicle having a main fuel-consuming engine and a main fuel container associated therewith, an auxiliary fuel-consuming engine having an auxiliary fuel container associated therewith, and hood means mounted on the vehicle for covering at least one of the engines and including a depending portion with an opening therein, the improvement residing in: a closure member registrable with and for covering and uncovering said opening; means mounting the closure member on the vehicle for movement of said member laterally into and out of opening-covering position; means mounting the auxiliary fuel container on and for movement with said member to pass inwardly through the opening and within the hood means as the closure member is moved laterally to its opening-covering position and to pass outwardly through the opening and outside the hood means when the member is in its open position, and flexible fuel-transferring means extending from the auxiliary fuel container to the auxiliary fuel consuming engine and being mounted in a manner so as to accommodate movement of the member to and from its covering position.

7. In a vehicle having a main fuel-consuming engine and a main fuel container associated therewith, an auxiliary fuel-consuming engine having an auxiliary fuel container associated therewith, and hood means mounted on the vehicle covering at least one of said engines and including a depending portion with an opening therein, the improvement residing in: a closure member registrable with and for covering and uncovering said opening hingedly mounted on the vehicle for swinging laterally into and out of opening-covering position; means mounting the auxiliary fuel container on and for movement with said member to pass inwardly through the opening and within the hood means as the closure member is swung to its opening-covering position and to pass outwardly through the opening and outside the hood means when the member is swung to its open position, and flexible fuel-transferring means extending from the auxiliary fuel container to the auxiliary fuel consuming engine and being mounted in a manner so as to accommodate swinging of the member to and from its covering position.

References Cited in the file of this patent

UNITED STATES PATENTS

| | | |
|---|---|---|
| 1,177,007 | Auerbacher | Mar. 28, 1916 |
| 1,356,065 | Heinze | Oct. 19, 1920 |
| 2,100,490 | Rippingille | Nov. 30, 1937 |
| 2,119,794 | Rosen | June 7, 1938 |
| 2,250,795 | FitzGerald | July 29, 1941 |
| 2,437,121 | Peterson | Mar. 2, 1948 |
| 2,607,433 | Simi | Aug. 19, 1952 |

FOREIGN PATENTS

| | | |
|---|---|---|
| 731,741 | France | May 31, 1932 |
| 413,604 | Italy | May 20, 1946 |